United States Patent Office 3,557,178
Patented Jan. 19, 1971

3,557,178
PRODUCTION OF QUATERNARY, ORGANOSILI-
CON-SUBSTITUTED AMMONIUM SALTS
Dietrich Gölitz, Cologne-Stammheim, and Walter Simm-
ler, Odenthal-Schlinghofen, Germany, assignors to Far-
benfabriken Bayer Aktiengesellschaft, Leverkusen,
Germany, a corporation of Germany
No Drawing. Filed Jan. 16, 1968, Ser. No. 698,110
Claims priority, application Germany, Jan. 24, 1967,
F 51,328
Int. Cl. C07f 7/18
U.S. Cl. 260—448.8
6 Claims

ABSTRACT OF THE DISCLOSURE

Methyl-alkoxy- or methyl-phenoxy-silyl derivatives of tetramethyl ammonium bromide, siloxane homo-condensates thereof as well as co-condensates thereof with hydrocarbyl-siloxanes are produced by reacting the corresponding derivatives of methylbromide with trimethylamine in an improved manner by carrying out the reaction in the presence of an inert polar solvent having a dielectric constant above 25 at 20° C., at a temperature of not more than 50° C.

---

This invention relates to the production of silicon-organic derivatives of tetramethyl ammonium bromide corresponding to the general formula $$[(R-O-)_aSi(CH_3)_{3-a}-CH_2-N(CH_3)_3]^{\oplus}Br^{\ominus}$$

their homogeneous siloxane condensation products, and their products of co-condensation with organosiloxanes of the empirical formula

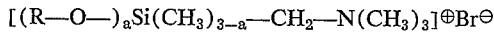

R above representing an alkyl radical containing 1 to 6 carbon atoms or a phenyl radical, R' representing any desired, optionally inertly substituted, hydrocarbon radicals, $a$ being 1 or 2, and $n$ being a numerical value from 1 to 3.

It is known, e.g. from British patent specification No. 697,684, to produce such salts by reacting halomethyl-silicon compounds with tertiary amines. In the case of trimethylamine, because of the low speed of reaction at lower temperatures, the reaction had to be accompanied by heating to above 100° C. and consequently in pressure vessels in order to attain a satisfactory yield. It is also known in this connection that the use of solvents, such as toluene or anhydrous alcohol, does not afford any special advantages. Indeed, our own experiments have shown that the reaction in alcohol does not succeed because it leads, according to the equation

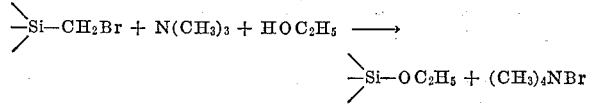

predominantly to an alkoxylation of the bromomethyl-silicon compounds rather than an amination. The same could be observed when other alcohols and phenol were used, which means that these do not have an inert behaviour.

Furthermore, it is known that quaternary ammonium compounds are obtained by the reaction of aminoalkyl-silicon compounds with alkyl halides. This method has several disadvantages however. In the first place the preparation of the amine compound to be quaternized requires additional process steps, e.g. hydrogenation of cyanoalkyl-silicon compounds, or the preparation of tertiary amino compounds according to the aforementioned Patent Specification; moreover, expensive alkyl halides, in some cases in large quantities, are required for quaternizing the resultant amino compounds; and finally, the products of the process consist of mixtures of the desired quaternary with tertiary ammonia derivatives.

We have now found that the above-mentioned quaternization can be carried out with the aid of a selected group of inert solvents with a slight increase in temperature, obtaining products with a 100% yield which are free from hydrohalide.

According to the invention a process for the production of the compounds defined above by reacting bromomethyl-silicon compounds of the formula $$(R-O-)_aSi(CH_3)_{3-a}-CH_2Br$$

their homogeneous siloxane condensation products or their products of co-condensation with organosiloxanes of the empirical formula

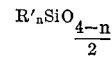

with trimethylamine in the presence of an inert solvent, is characterized by using as the inert solvent a polar solvent having a dielectric constant above 25 at 20° C., and by carrying out the reaction at a temperature of at most 50° C.

In the case of the co-condensation products any numerical proportion of the hydrocarbon-substituted siloxane units to the carbofunctional siloxane units is possible, but it is preferably 1:1 to 20:1.

Suitable polar but inert solvents are acetonitrile, benzonitrile, dimethyl formamide, and dimethyl sulphoxide, having dielectric constants of 37.5, 25.6, 37.6 and 45.0 respectively at 20° C. The amount of the solvent to be used in the reaction is not critical; its proportion by weight to the amount of silicon compound expediently amounts to 10 to 500%, preferably 50 to 200%. The solubility of trimethylamine in polar solvents is generally limited. To attain a high concentration of the reaction product it is therefore advantageous firstly to dissolve the bromomethyl-silicon compound in the polar solvent and then to introduce the amine into this solution at the reaction temperature. In some cases, the reaction proceeds markedly exothermically.

Occasionally, for example when one of the alkoxylated products of the process is to be subjected either by itself or in admixture with other hydrolyzable organosilicon compounds to a hydrolysis and condensation to give polysiloxanes, it is not necessary to remove the solvent. The same is true when the bromide, which is initially obtained in any case, is to be converted according to known methods into the salt of another acid. If, on the other hand, it is intended to isolate the reaction product, then it may be advantageous to choose a highly volatile solvent, e.g. acetonitrile, in order to remove this after the reaction together with an excess of trimethylamine in a vacuum. The product of the process then remains without a noticeable impurity.

The quaternary ammonium bromides thus produced are colourless, or slightly yellow-coloured, and crystalline, or they have a wax-like or oily consistency. If the proportion of N to Si amounts to approximately 1:3 or more, then they dissolve in water giving a clear solution and thus enable organosiloxanes to be technically used in aqueous solution. When the proportion N:Si is lower, they are capable of self-emulsifying in water.

The products of the process of the invention find use as interfacial-active agents, e.g. as emulsifiers, and as modifiers for organopolysiloxane resins and oils.

In the following examples, which are given for the purpose of illustrating the invention, "parts" are "parts by weight."

EXAMPLE 1

Anhydrous trimethylamine is introduced in a current of 30 parts per hour into a solution of 200 parts methyl-(bromomethyl)-diethoxysilane in 100 parts acetonitrile, the temperature slowly rising to approximately 50° C. The reaction is completed after about 3 hours, as can be observed by bromide titration of a sample. The solvent and excess trimethylamine are then driven off by heating up to 80° C./13 mm. Hg and there is obtained as the residue, in a yield of practically 100%, the crystalline, very hygroscopic N - (methyl - diethoxy-silyl-methyl)-trimethyl-ammonium bromide of the formula

EXAMPLE 2

865 parts methyl-(bromomethyl)-diethoxysilane are added dropwise to a solution of 247 parts trimethylamine in 1250 parts dimethyl formamide and the reaction mixture is allowed to stand at room temperature for 24 hours. The solvent and excess trimethylamine are then driven off by heating up to 80° C./10$^{-2}$ mm. Hg. As residue the same compound as that produced in Example 1 is obtained in a yield of practically 100%.

EXAMPLE 3

112 parts trimethylamine and 200 parts dimethyl-(bromomethyl)-ethoxysilane are dissolved in 388 parts benzonitrile, and this solution is allowed to stand at room temperature for 8 hours. The crystalline slurry thus formed is then mixed, while stirring, with 300 parts diethyl ether, it is filtered with the exclusion of moisture and after-washed with a further 200 parts ether. The filter residue is freed from adhering solvent residues by evacuation at room temperature, and there are thus obtained in the form of a white, hydrolysis-sensitive crystalline mass, 182 parts (70% theoretical) N-(dimethyl-ethoxysilylmethyl)-trimethyl-ammonium bromide of the formula

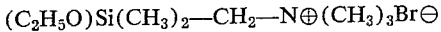

EXAMPLE 4

160 parts methyl-(bromomethyl)-diphenoxysilane are introduced into a solution of 59 parts trimethylamine in 250 parts benzonitrile, and the reaction mixture is allowed to stand at room temperature for 6 hours with the exclusion of moisture. While moisture is still excluded, the mixture is then stirred with 500 parts diethyl ether and filtered, and the filter residue is washed twice with portions of 150 parts ether, the residues of which are removed by evacuation. There is obtained a white powder, which is very sensitive to hydrolysis, consisting of N-(methyl-diphenoxysilylmethyl)-trimethyl ammonium bromide of the formula

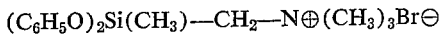

EXAMPLE 5

60 parts an hydrous trimethylamine are introduced at a temperature between 40 and 45° C., and in a current evenly distributed over 12 hours, into a solution of 40 parts 1,3-di-(bromomethyl)-tetramethyl-disiloxane in 100 parts dimethyl sulphoxide. The precipitated white reaction product is stirred with 200 parts diethyl ether; it is then filtered off, washed twice with portions of 100 parts ether, and the adhering solvent is removed by evacuation. There remain 40.5 parts (73% theoretical) 1,3-bis-(trimethyl-amino-methyl)-tetramethyl-disiloxane-dibromide of the formula

EXAMPLE 6

By hydrolysis of methyl-(bromomethyl)-dichlorosilane, dissolved in an inert solvent, and by fractional distillation in a high vacuum of the hydrolysate, 1,3,5,7-tetra-(bromomethyl) - tetramethyl-cyclotetrasiloxane is prepared in known manner. 10 parts thereof are dissolved in 100 parts benzonitrile, and trimethylamine is introduced into this solution at room temperature until the bromide titration of a sample of the reaction mixture indicates the completion of the reaction. The reaction product is then precipitated by the addition of 200 parts diethyl ether, is filtered off with the exclusion of moisture and is freed in a high vacuum from adhering solvents. There is obtained a white, hygroscopic powder of 1,3,5,7-tetrakis-(trimethylamino-methyl)-tetramethyl - cyclotetrasiloxane - tetrabromide of the formula

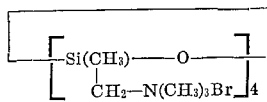

EXAMPLE 7

600 parts of a polysiloxane of the symmetrically idealized formula

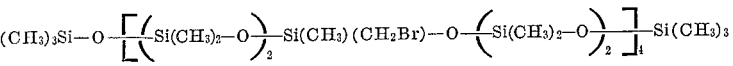

are dissolved in 200 parts acetonitrile, and 200 parts trimethylamine are introduced into this solution, in a current evenly distributed over 10 hours, at a temperature between 35 and 45° C., while stirring. The acetonitrile and an excess of amine are then removed from a reaction mixture at 80° C. and 10$^{-1}$ mm. Hg. There remains a hygroscopic product which is viscous at room temperature and starts to flow at approximately 70° C., the constitution of which corresponds to the formula

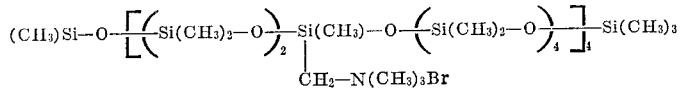

What is claimed is:
1. In a process for the production of a quaternary organo-silicon substituted ammonium salt of the general formula

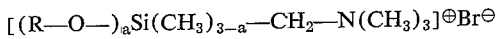

wherein R is an alkyl radical containing 1 to 6 carbon atoms or a phenyl radical and $a$ is 1 or 2, a siloxane homo-condensation product thereof or an organosiloxane co-condensation product thereof, by reacting a bromethyl-silicon compound of the general formula

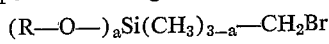

a siloxane homo-condensation product thereof or a product of co-condensation thereof with an organosiloxane of the empirical formula

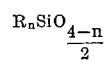

and $n$ has a numerical value from 2 to 3, with trimethyl-amine in the presence of an inert solvent, the improvement which comprises utilizing as said inert solvent a polar solvent having a dielectric constant above 5 at 20° C., selected from the group consisting of nitriles, substituted formamides and substituted sulfoxides and carrying out the reaction at a temperature of at most 50° C.

2. Process as claimed in claim 1 wherein the said solvent is selected from the group consisting of acetonitrile, benzonitrile, dimethyl formamide, and dimethyl sulphoxide.

3. Process according to claim 1 wherein the solvent is used in an amount of 10 to 500%, based on the weight of the silicon compound.

4. Process according to claim 3 wherein the solvent is used in an amount of 50 to 200%, on the same basis.

5. Process according to claim 1 wherein the said bromomethyl silicon compound is firstly dissolved in the said solvent, and then the trimethylamine is introduced into this solution at the reaction temperature.

6. Process according to claim 1 wherein the reaction temperature is room temperature.

References Cited

UNITED STATES PATENTS

| 2,972,598 | 2/1961 | Morehouse | 260—448.2X |
| 3,215,666 | 11/1965 | Simmler (I) | 260—448.2X |
| 3,297,735 | 1/1967 | Simmler (II) | 260—448.2(E) |
| 3,324,161 | 6/1967 | Simmler (III) | 260—448.2(E) |
| 3,448,137 | 6/1969 | Niederprümer et al. | 260—448.8 |
| 3,449,393 | 6/1969 | Sattlegger et al. | 260—448.2(E) |

TOBIAS E. LEVOW, Primary Examiner

P. F. SHAUER, Assistant Examiner

U.S. Cl. X.R.

260—448.2

PO-1050
(5/69)

UNITED STATES PATENT OFFICE
CERTIFICATE OF CORRECTION

Patent No. 3557178           Dated  Jan. 19, 1971

Inventor(s) Dietrich Gölitz and Walter Simmler

It is certified that error appears in the above-identified patent and that said Letters Patent are hereby corrected as shown below:

It is certified that error appears in the above-identified patent and that said Letters Patent are hereby corrected as shown below:

Column 3, line 67, "an hydrous" should read --anhydrous--

Column 4, 2d formula of Example 7, that portion reading "$(CH_3)Si-O$" should read --$(CH_3)_3Si-O$--, and that portion reading "$(-Si(CH_3)_2-O)_4-]_4$" should read --$(-Si(CH_3)_2-O)_2]_4$--

The Assistant Examiner's name should read --Shaver-- instead of "Shauer"

Signed and sealed this 13th day of July 1971.

(SEAL)
Attest:

EDWARD M. FLETCHER, JR.          WILLIAM E. SCHUYLER
Attesting Officer                Commissioner of Pat